March 14, 1961 R. G. BEAGLE 2,974,443
ADJUSTABLE DISPLAY AND FLOWER HOLDER
Filed Jan. 13, 1958
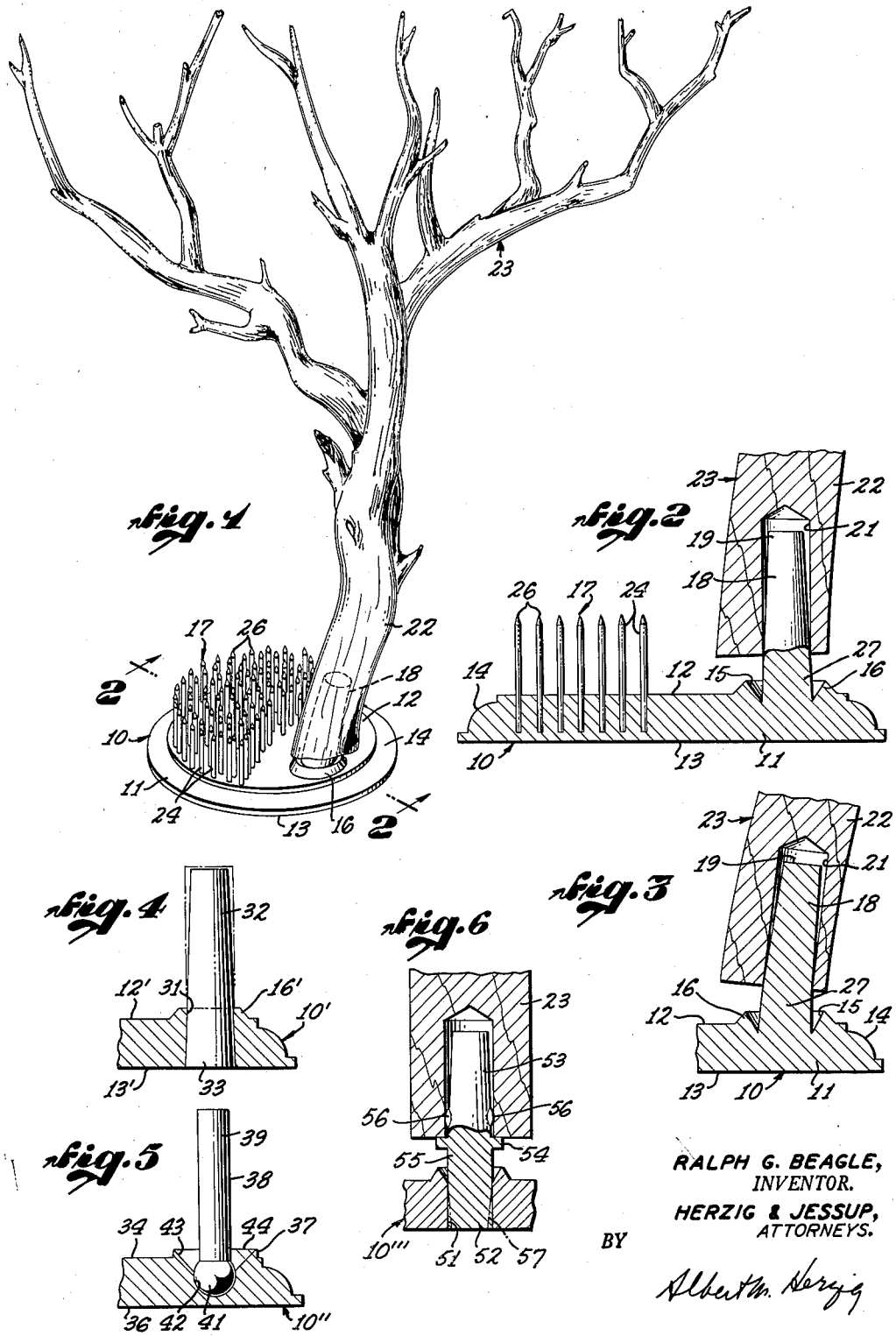
RALPH G. BEAGLE,
INVENTOR.
HERZIG & JESSUP,
ATTORNEYS.

United States Patent Office 2,974,443
Patented Mar. 14, 1961

2,974,443

ADJUSTABLE DISPLAY AND FLOWER HOLDER

Ralph G. Beagle, 91 N. Beacon Place, Pasadena, Calif.

Filed Jan. 13, 1958, Ser. No. 708,573

3 Claims. (Cl. 47—41)

This invention relates to an adjustable display and flower holder, and more particularly to a holder having a weighted base, means for piercing and for supporting the stems of flowers, or the like, and means for supporting a heavier basic or background display object such as a miniature tree, or the like.

Whereas various display flower holders have been previously provided which include a weighted base and a plurality of sharpened pins for piercing and supporting flower stems, they are not particularly suitable for supporting an object such as a miniature tree or a branch of a bush or tree having a harder and more fibrous stem or trunk which is difficult to penetrate by the sharpened pins. Heretofore, when dried material such as manzanita or the like has been displayed, usually by means of screws extending from or through the base and into said dried material, a disadvantage which has been encountered is the difficulty of placing or shifting the tree to a desired angle, relative to the base, while still obtaining sufficient support of the tree. If it is sought to change the angle of the tree for another desired effect, the mutilation of the lower end of the tree must be repeated to achieve the desired new result or aspect. Cutting on the bias of the grain of the tree to achieve a desired angle makes it even more difficult for the pointed pins to penetrate the tree, as they tend to normally penetrate longitudinally through the fibers.

It is therefore an object of this invention to provide a new and improved display and flower holder which provides means for easily and quickly piercing the softer and less fibrous stems of plants or flowers for supporting such stems in a desired arrangement, and which further provides means for supporting a heavier or more massive object such as a manzanita tree, or the like, which has a tougher and more fibrous consistency.

It is another object of this invention to provide a display and flower holder which provides a new and improved means for supporting the heavier or tougher, more fibrous, object in any desired angular relationship to the base whereby varied effects of flower arrangements can be achieved.

It is a further object of this invention to provide a display and flower holder in which a new and improved support means may be easily and quickly manually manipulated to adjust and hold the angular relationship of the support means and the base.

It is a further object of this invention to provide a new and improved display and flower holder which is economical to manufacture and capable of mass production.

It is a general object of this invention to provide a new and improved display and flower holder which overcomes disadvantages of prior means and methods heretofore intended to accomplish generally similar purposes.

These and other objects of this invention will be more apparent from the following description of the drawings and the appended claims.

In the drawings:

Fig. 1 is a perspective view, in elevation, of a holder in accordance with this invention, illustrating its use to support a miniature tree, or the like;

Fig. 2 is an enlarged vertical sectional view as taken on a line 2—2 of Fig. 1;

Fig. 3 is an enlarged fragmentary vertical sectional view, illustrating a portion of the holder in an adjusted position;

Fig. 4 is a fragmentary vertical sectional view, with a portion thereof shown in elevation, of another embodiment of this invention; and Fig. 5 is a fragmentary vertical sectional view, with a portion thereof shown in elevation, illustrating a further embodiment of this invention.

Fig. 6 is a fragmentary vertical sectional view, with a portion thereof shown in elevation, illustrating a still further embodiment of this invention.

Referring to the drawings, and more particularly to Figs. 1–3, there is shown by way of illustration but not of limitation, a display and flower holder generally referred to by the numeral 10, which comprises a base 11 having substantially parallel flat top and bottom surfaces 12 and 13, respectively. The base may be of any desired configuration, but is shown herein for example as being circular and having a quarter-rounded circumferential edge surface 14. The principal purpose of the base 10 is to provide sufficient weight to overcome any tendency of the holder to tip after the arrangement of flowers and trees or branches have been placed thereon, it is therefore preferable that the base is formed or cast of a relatively heavy material such as lead, or the like.

The base 10 includes an upwardly projecting boss 16, of frusto-conical or other configuration. The boss 16 may be centrally located if desired, or as illustrated, located near the edge of the base to provide clearance for flower-supporting means 17. An elongated post or stem 18 is provided on the base 10 extending upwardly from the boss 16. The boss 16 is preferably counter-sunk or relieved as indicated at 15 to permit a greater freedom in bending when the stem 18 is angularly bent relative to the base as will hereinafter be described.

The stem 18 may be of a cylindrical or other configuration, but as noted is preferably tapered slightly towards its upper end 19 to facilitate insertion of the stem 18 into a drilled hole 21 of the base 22 of a manzanita tree 23, or the like. The angle at which the aperture 21 is drilled relative to the longitudinal axis of the trunk 22 is advantageously not critical, therefore drilling by a skilled operator is unnecessary. The aperture 21 is preferably slightly larger diametrically than the stem 18 and sufficient in depth to encompass a substantial portion of the stem.

The means 17 for supporting flower stems or the like, comprises a plurality of cylindrical or otherwise cross-sectionally shaped pins 24 of a reduced diameter, the lower ends of which are held within the base 10 as by molding of the material of the base around the pins. The pins 24 are preferably provided with sharpened upper ends 26 for piercing the bottom of a flower stem to facilitate telescoping of the stem over the pins 24 for support of the stems. The supporting means may optionally include a mesh or basket weave wire support (not shown) or other suitable means, such as a plurality of vertical holes drilled in the base to receive stems of flowers. If preferred, a base may be provided which includes merely the stem extending upwardly therefrom, and lacking any other means for supporting other than for the tree.

A feature of this invention is the angular adjustability of the vertical stem 18 relative to the base 10 in order that the tree 23 may be arranged in any desired and pleasing angular relationship to the base. For this purpose, the stem 18, boss 16 and base 10 may be cast or molded integrally of the relatively heavy malleable material such as lead, copper, or the like. The malleable metal permits ready bending of the stem 18 relative to the base 10 to position the tree 23 and obtain a desired effect, and further permits repeated bending back and forth of the stem 18 to alter the position of the tree, as required, without causing the stem to become excessively work-hardened at the base portion 27 and break off.

As previously mentioned, the tree 23 is longitudinally drilled as at 21 to provide an aperture substantially parallel to the grain or fibers of the trunk 22, and having a depth sufficient to accommodate a substantial portion of the stem 18 of the holder. The tree 23 may then be grasped as by one hand of the operator, and the base 10 steadied as by the other hand of the operator whereby the tree 23 may be manipulated until the stem 18 is bent sufficiently to position the tree as desired. If the desired effect is not initially achieved, the tree may be additionally forced to one side or the other until a more pleasing effect is achieved. The base 10 may then be placed in a bowl or other container to be immersed in water if desired. If it is desired to combine flowers with the tree 23 for a floral arrangement, the stems of the flowers (not shown) are pushed over the pins 24 by piercing the ends of the stems with the sharpened ends 26 of the pins.

Referring to Fig. 4, another embodiment of this invention is illustrated, wherein a base 10' includes upper and lower surfaces 12' and 13', respectively, and an upwardly extending boss 16'. An aperture 31 is provided in the base extending transversely through the base 10' and the boss 16' in which a pin or stem 32 is disposed. The pin 32 may be of cylindrical or other configuration and it is preferably tapered at its lower end to provide a broader base 33 complementary to the aperture 31. The pin 32 may be optionally driven through the aperture 31 of the base 10', from the bottom, after the formation of the base, or the material of the base 10 may be cast around the pin 32 subsequent to positioning of the pin in a suitable mold.

In the instant embodiment, the base 10' preferably comprises pure or alloyed lead or other suitable heavy material. The stem 32 is formed as of a suitable malleable material, such as pure lead, copper, or the like, or of an alloy consisting of lead and a hardening agent such as antimony, in which the hardening agent does not exceed 5% of the alloy, to preserve the malleability of the stem and facilitate bending thereof as desired without the use of tools, other than manual force applied to a tree inserted thereover, as previously described in the first embodiment.

The base 10' and pin 32, in accordance with this instant embodiment, may be advantageously packed and shipped in a separated state and assembled afterwards by driving the stem through the base from the bottom thereof.

Referring to Fig. 5, a further embodiment of the invention is illustrated, wherein a base generally referred to by the numeral 10" includes upper and lower surfaces 34 and 36, respectively, and an upwardly extending boss 37. A stem 38 of relatively rigid material includes a shank portion 39 and a spherical end portion 41. The spherical end portion 41 is rotatably disposed in a complementary spherical cavity 42 of the base 10". A counter-sunk opening 43 is preferably provided to communicate between the spherical cavity 42 and the upper surface 44 of the boss 37, to provide clearance for the shank 39 when the pin 38 is tilted to achieve a desired angular effect of a tree like 23 supported thereon. The base 10" may in this instance be of any suitable material to afford greater wear between the spherical ball end 41 of the pin 38 and the complementary cavity or socket 42 of the base 10".

In the embodiment illustrated in Fig. 6, a base 10''', similar to bases 10' and 10", includes an aperture 51 extending therethrough in which a post or stem 52 is non- rotatably disposed. The stem 52, in this instance, may be formed with a cylindrical or frusto-conical upper portions 53 adapted to be inserted into the drilled bole 21 of the tree or branch 23. An annular shoulder 54 may be provided on an intermediate portion of the stem 52, preferably substantially spaced from the base 10''', to support the base 22 of the tree 23. In this manner, the tree 21 may fit loosely on the stem 52 and yet be supported by the shoulder 54 to provide an area 55 of the stem, between the shoulder 54 and the base, which is free to bend for obtaining a desired effect. One or more protrusions 56 may be formed on the upper portion of the stem 53, as by upsetting or the like, to prevent rotation of the tree 23 after a desired effect has been achieved, or if desired, the shoulder 53 may be omitted and the protrusions 56 used to retain the tree 23 in an elevated position above the base.

If preferred, the lower portion of the stem 52 may be tapered, as indicated by the broken lines 57, to facilitate insertion of the stem into the aperture 51, and enable packing and shipping of the base and stem in a separated state whereby the base and stem may be assembled afterwards, as by driving the stem into the base from the top.

In general, this invention comprises a base having any suitable configuration but having a relatively heavy mass in order to counter-balance any tipping tendency caused by an unequal distribution of weight of displayed items such as flowers, manzanita trees, or the like. A post or stem is provided in the base, and extends upwardly thereform, to engage and support an apertured base of a tree or branch, the stem being adjustable angularly, relative to the base, to position the tree or branch in any desired angular effect.

The suggested hole 21, or other means of engaging a tree, or the like, is preferably larger than the diameter of the supporting post; said excessive annular space between the post and the hole can be taken up by providing a suitable degree of curvature to the post so that a wedging action is achieved to hold the tree in its intended posture and position. The taper of the post can also provide a desired wedging action alone, or in combination with, the bending or kinking of the stem, which is given a sufficient length and malleability for such purpose.

Further provision is made, in the form of upwardly extending sharpened pins or other suitable means, to pierce and/or support the stems of flowers or the like which are easily pierced. The base and component parts thereof are preferably made of a non-corrosive material, whereby the base may be placed within a bowl or plate of water of sufficient depth to reach and freshen the stems of the flowers and the branch, if desired.

While I have herein shown and described what I conceived to be the most desired embodiments of my invention, it is to be understood that alterations and modifications thereof may be made in a manner to satisfy the spirit of my invention which is intended to comprehend all equivalent devices as comprehended in the following claims.

What I claim as new and desire to secure by Letters Patent is:

1. An adjustable display holder, for a fibrous plant having a relatively heavy trunk and a longitudinal bore extending through the trunk at a lower end thereof, comprising: a base of relatively heavy material having a substantial thickness and an upper surface; an elongated, malleable stem on said base, extending upwardly from said upper surface, and dimensioned to detachably, internally fit in the bore of the trunk, said stem being bendable so as to angularly posture the plant relative to said base, including protrusion means on said stem, spaced intermediate of the outer end thereof and said base and internally engageable with the bore of the plant trunk for yieldably securing said trunk on said stem means.

2. An adjustable display holder, for a fibrous plant having a relatively heavy trunk and a longitudinal bore extending through the trunk at a lower end thereof, comprising: a base of relatively heavy material having a substantial thickness and an upper surface; an elongated, malleable stem on said base, extending upwardly from said upper surface, and dimensioned to detachably, internally fit in the bore of the trunk, said stem being bendable so as to angularly posture the plant relative to said base, wherein said base includes means defining a transverse bore communicating with said upper surface and said stem means includes a cylindrical lower portion residing in said transverse bore, and wherein said transverse bore includes means defining a conical bore communicating between said bore and the upper surface of said base, the junction of said conical bore and said transverse bore being below said upper surface, and said bending of said stem initiates below said upper surface of said base.

3. An adjustable display holder, for a fibrous plant having a relatively heavy trunk and a longitudinal bore extending through the trunk at a lower end thereof, comprising: a base of relatively heavy material having a substantial thickness and an upper surface; an elongated, malleable stem on said base, extending upwardly from said upper surface, and dimensioned to detachably, internally fit in the bore of the trunk, said stem being bendable so as to angularly posture the plant relative to said base, wherein said base includes means defining a transverse bore communicating with said upper surface and said stem means includes a cylindrical lower portion residing in said transverse bore, including a boss on said upper surface of said base and means defining a conical bore communicating between said bore and the upper surface of said boss, the intersection of said bores being below said upper surface of said base, so that the bending of said stem initiates below said upper surface.

References Cited in the file of this patent

UNITED STATES PATENTS

| | | |
|---|---|---|
| 894,203 | Harvey | July 28, 1908 |
| 1,664,436 | Tonnesen | Apr. 3, 1928 |
| 2,332,352 | Smith | Oct. 19, 1943 |
| 2,333,561 | Hamblin | Nov. 2, 1943 |
| 2,545,383 | Regan | Mar. 13, 1951 |
| 2,601,743 | Karsted | July 1, 1952 |
| 2,686,989 | Dillon | Aug. 24, 1954 |
| 2,763,096 | Roger | Sept. 18, 1956 |

FOREIGN PATENTS

| | | |
|---|---|---|
| 217,962 | Great Britain | July 3, 1924 |